Sept. 25, 1923.

R. B. GLIDDEN

TRUCK UNLOADING APPLIANCE

Filed March 7, 1921

Witness:
R. Burkhardt

Inventor:
Raymond B. Glidden
By Walter M. Fuller
Atty.

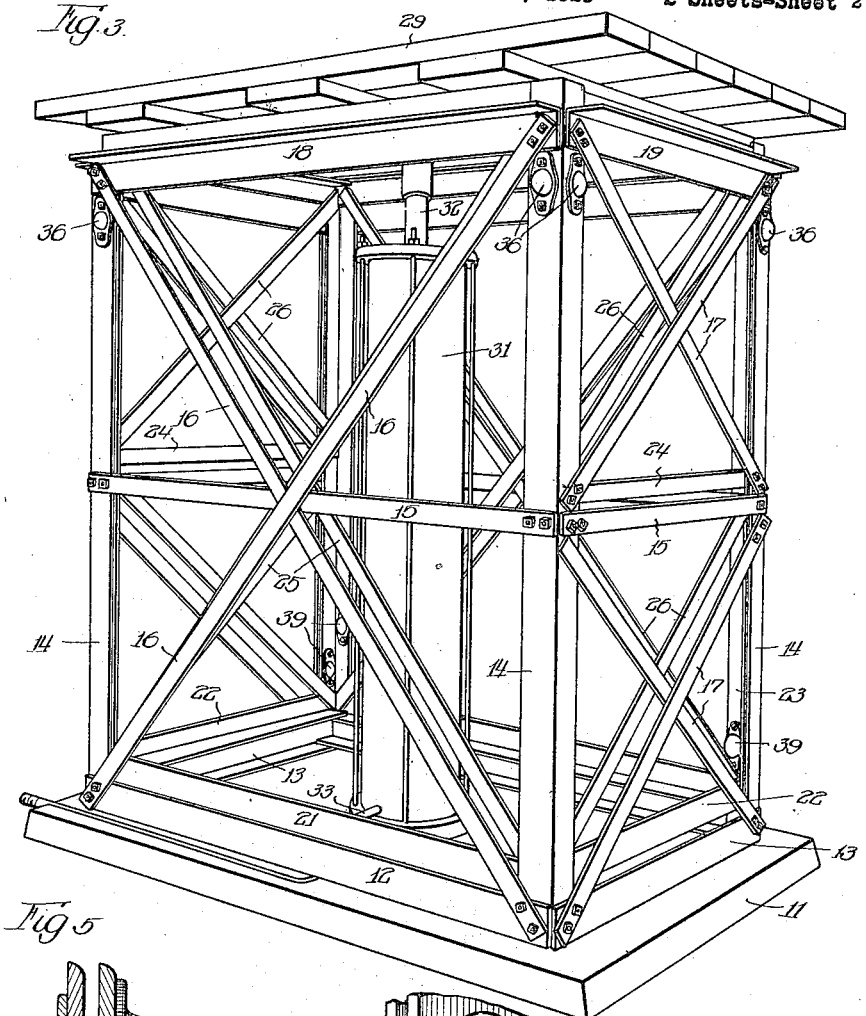

Patented Sept. 25, 1923.

1,468,631

UNITED STATES PATENT OFFICE.

RAYMOND B. GLIDDEN, OF KEWANEE, ILLINOIS, ASSIGNOR TO KEWANEE IMPLEMENT COMPANY, OF KEWANEE, ILLINOIS, A CORPORATION OF ILLINOIS.

TRUCK-UNLOADING APPLIANCE.

Application filed March 7, 1921. Serial No. 450,285.

*To all whom it may concern:*

Be it known that I, RAYMOND B. GLIDDEN, a citizen of the United States, residing at Kewanee, in the county of Henry and State of Illinois, have invented certain new and useful Improvements in Truck-Unloading Appliances, of which the following is a specification.

My invention aims to provide a simple, efficient, and easily-operated apparatus for dumping or discharging the contents of vehicles not fitted or equipped with special means for performing such unloading operation.

Stated somewhat differently, the leading purpose of the invention is the production of a suitable appliance for easily and readily dumping the loads of vehicles, such as motor-trucks of the ordinary type, as for example those customarily used by farmers and others.

Such unloading or load-discharging mechanisms are of value and service in connection with grain elevators and similar establishments, where it is desired to quickly dispose of the loads of vehicles unfitted or not supplied with dumping arrangements and of varying sizes, weights, capacities, etc.

To this end, the improved and novel appliance is composed of a platform adapted to support the front wheels only of the truck, and provided with means for effecting its rise or elevation, whereby the truck assumes a sufficiently inclined or sloping disposition to easily dump or discharge its contents out the rear end, whereupon the platform is lowered to normal position allowing the empty truck or other vehicle to be driven away.

One outstanding purpose of the invention is the provision of a mechanism of this type capable of performing the work specified, which is comparatively economical to manufacture and maintain in proper operative condition, which is unlikely to become damaged or injured in ordinary service, and which can be satisfactorily actuated by novices without substantial danger of improper performance.

In order that those skilled in this art may have a full and complete understanding of the invention both from structural and functional standpoints, I have illustrated a preferred and desirable embodiment of the invention in the accompanying drawings forming a part of this specification, and to which reference should be had in connection with the following detailed description, like reference characters referring to the same parts throughout the several views.

In these drawings:

Figure 3 is a perspective view of the same parts on a larger scale showing the platform in lowered position;

Figure 4 is a fragmentary view partly in section illustrating the anti-friction ball constructions employed in connection with the telescoping frames; and Figure 5 is a horizontal section through one corner of the telescoping posts or uprights showing the anti-friction ball arrangements.

Figure 1:
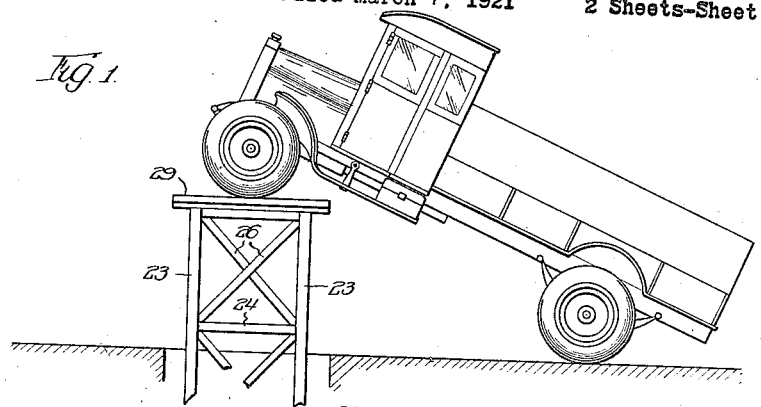
Figure 1 is a fragmentary view showing a portion of the appliance in truck unloading position.

The appliance, as is clearly depicted in the drawings, includes a base-plate 11 located the proper distance below the floor or surface of the ground on which the truck or vehicle is adapted to travel so that when the platform is in its lowermost position, it will be flush with or on a level with such floor or ground, whereby the truck may be driven on to or over the platform with facility and ease.

Mounted on such base or foundation plate, located in a suitable pit or in any case at the proper level, is an outer, stationary, rectangular frame composed of bottom, side and end angle-bars 12 and 13, each with one flange resting on the base and its other flange standing up therefrom for the ready attachment thereto of other sustaining members of the framework.

Upstanding corner angle-bar posts 14 are fastened at their lower ends against the inner faces of the flanges of the base angle-bars 12 and 13 being connected together to strengthen and stiffen the framework by horizontal brace-bars or straps 15 and crossing, inclined or diagonal bars or straps 16 and 17.

Figure 2:
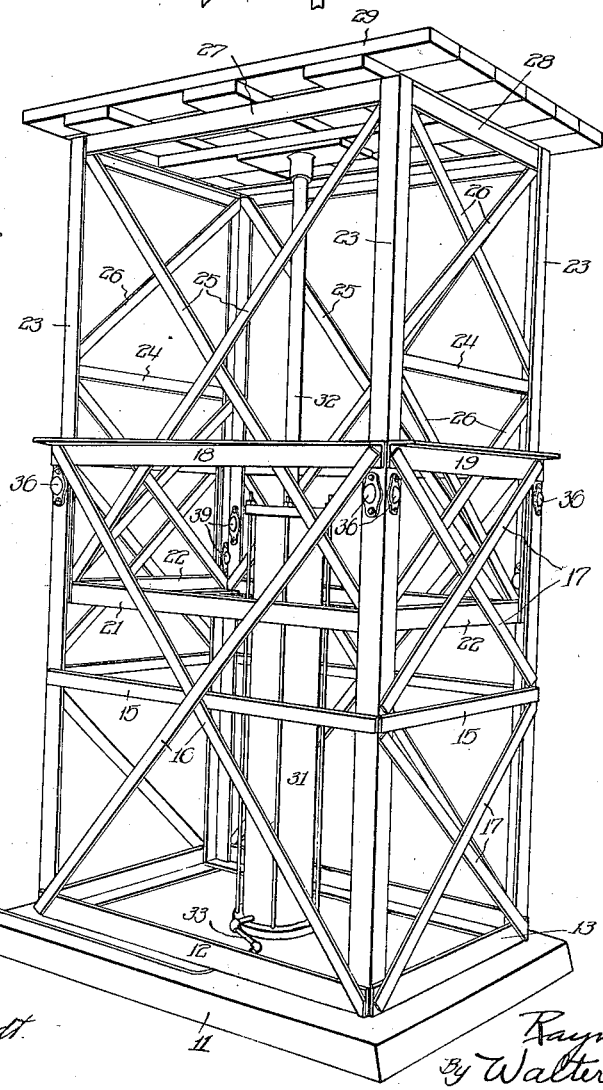
Figure 2 is a perspective view of the vertically movable platform and its actuating mechanism with the platform at or near its uppermost limit of movement.

At their upper ends, such corner posts or standards and oblique stay bars are fastened to the downwardly extended flanges of top, side and end angle-bars 18 and 19 having their other horizontal flanges disposed outwardly, some of the ends of the shorter crossed bars 17 being secured to the posts themselves at about midway of their height, all as is clearly illustrated in Figures 2 and 3.

Telescopically or slidably disposed inside of such outer fixed or stable frame, and adapted to move vertically therein, is an inner rectangular frame only slightly smaller than the surrounding or enclosing framework.

This interior skeleton frame is built up of horizontal side and end bottom angle-bars 21 and 22, vertical, corner, angle-bar posts 23, horizontal and inclined brace strips 24, 25, and 26, and top, side and end bars 27 and 28, a suitable and appropriate plank platform 29 being mounted on the top of such movable inner frame.

A vertical or upright cylinder 31 is mounted on the middle of the base 11 and contains a reciprocatory plunger or piston, not shown, on the lower end of a supporting shaft 32 connected to the bottom face of the platform 29, the lower end of the cylinder or casing having a pipe 33 for the admission and discharge of compressed air beneath the piston, whereby the rise and descent of the inner frame and its platform may be readily controlled, it being understood, of course, that other suitable lifting means may be employed if preferred, such as electric or hydraulic mechanism. Pipe 33 at a suitable point is equipped with a controlling valve, not shown, but which, of course, is necessary to govern the flow of compressed air into and its discharge from the cylinder.

To facilitate the upward and downward travel of the inner frame in the outer one, each corner bar 14 of the latter near its upper end is equipped in each of its two angularly-disposed flanges with an aperture 34 accommodating a portion of an anti-friction ball 35 which projects slightly through such hole inwardly of the frame, as shown in Figure 5, thus bearing on the face of the corresponding post of the inner reciprocatory frame.

Such ball is kept in place by a socket-member 36 fastened by bolts or rivets to the outer surface of the post, as is fully illustrated in Figure 3.

Each corner post or upright support 23 of the interior frame near its lower end is provided with vertically offset holes 37 in its two flanges, each associated with an anti-friction ball 38 extended outwardly partway through the hole to bear and roll on the inner face of the corresponding corner post of the outer frame, each of such balls being held in position and against displacement by a socket member 39 bolted or otherwise secured against the inner face of the post, as is fully shown in Figure 4.

It will be seen from this construction that the several balls of the outer frame bear on and assist in guiding the inner frame, and that the corresponding anti-friction elements of the inner frame travel or roll on the interior faces of the outer framework, thus guiding the movements of the traveling frame with a minimum of friction.

Since the balls of the outer frame are stationary and the companion or complementary balls of the inner frame are at the lower end of the latter, the distance between the two sets or groups is always the maximum permitted by the relative positions of the frames whereby the most efficient guiding by the balls is obtained.

In operation, the improved appliance is used substantially as follows:—

When the platform is in its lowermost position flush or on a level with the ground or the surrounding floor, the front wheels of the loaded truck are run on to the platform.

Then compressed air is admitted to the cylinder below its piston or plunger and the latter ascends raising the platform and the front portion of the truck, causing such vehicle to become sufficiently inclined to discharge its load out of its rear end as depicted in Figure 1.

The dumping or load delivery operation having been accomplished in this manner, the air in the cylinder is permitted to gradually escape, bringing about the corresponding slow descent of the platform, thus gradually causing the truck to assume its normal horizontal position.

When the platform has reached its lowermost position, the truck may be run over it or backed away from it, whereupon the platform is ready to receive the front wheels of the next loaded truck and to repeat the specified load discharging operation.

To those skilled in this art it will be clear that the invention is not limited and confined to the precise and exact details of construction presented since these may be modified within comparatively wide limits without departure from the heart and essence of the invention and without the sacrifice of any of its substantial benefits and advantages.

I claim:—

In a truck unloading appliance of the character described, the combination of a stationary outer frame, an auxiliary frame inside of and adapted to slide in said outer frame, an upright cylinder in said frames, a piston in said cylinder, means connecting said piston and inner frame, whereby the latter partakes of the movements of the former, ball-bearings near the top part of said outer frame bearing on said inner auxiliary frame, vertically offset ball-bearings on and near the lower end of said inner frame bearing on said outer frame, and a platform on said inner frame adapted to support the front wheels only of a truck to discharge its load, each ball-bearing comprising a ball projecting through a hole in the frame and held in position by a socket member secured to the other side of the frame.

RAYMOND B. GLIDDEN.